P. WILSON.
TIME AND COST COMPUTING AND RECORDING MECHANISM.
APPLICATION FILED FEB. 26, 1920.

1,385,414.

Patented July 26, 1921.
6 SHEETS—SHEET 1.

INVENTOR
Paul Wilson
BY
Raymond A. Parker
ATTORNEY

P. WILSON.
TIME AND COST COMPUTING AND RECORDING MECHANISM.
APPLICATION FILED FEB. 26, 1920.

1,385,414.

Patented July 26, 1921.

INVENTOR
Paul Wilson
BY
Raymond A Parker
ATTORNEY

UNITED STATES PATENT OFFICE.

PAUL WILSON, OF PILOT OAK, KENTUCKY.

TIME AND COST COMPUTING AND RECORDING MECHANISM.

1,385,414. Specification of Letters Patent. Patented July 26, 1921.

Application filed February 26, 1920. Serial No. 361,575.

*To all whom it may concern:*

Be it known that I, PAUL WILSON, a citizen of the United States, residing at Pilot Oak, county of Graves, State of Kentucky, have invented a certain new and useful Improvement in Time and Cost Computing and Recording Mechanism, and declare the following to be a full, clear, and exact description of the same, such as will enable others skilled in the art to which it pertains to make and use the same, reference being had to the accompanying drawings, which form a part of this specification.

My invention relates to clock controlled mechanism for computing and recording cost operations in manufacture, recording the time occupied in various operations, and recording other data in connection therewith.

The object is to provide a clock controlled mechanism which will print on a record card the starting time, certain variables referring to a certain job and material used, and then at the termination of a time period will print on the same card the time o'clock, time elapsed, and certain other variables representing itemized cost as figures on the basis of time elapsed, such as straight time wage, overtime, bonus, differential piece rate, et cetera.

A further object is to provide a clock controlled mechanism by the use of which information as to costs and time elapsed pertaining to a particular job, computed on the basis of definite time periods will be automatically selected and printed on a card of record.

A further object is to provide a clock controlled mechanism comprising a printing wheel bearing on its periphery types representing computed values of costs figured on the basis of time elapsed, a selective mechanism which will rotate the printing wheel and print on a record card the characters corresponding to the time periods measured.

This mechanism is clock controlled. The clock forms no part of the invention but is indicated at 1 and is provided with a centrally projecting shaft, the inner end of which carries a pinion 2 which is adapted to engage the pinion 3 which is mounted for rotation with shaft 3ª. Shaft 3ª is suitably supported by end standard 3ᵇ. Pinion 3 is itself engaged by an idler 5 which forms the central link in a chain with the pinion 6 which is fixedly mounted to a rotatably supported power shaft 8. This shaft 8 is mounted at the end adjacent the clock in suitable bearings carried by the end standard 3ᵇ and at the other extremity in bracket bearing 8ª carried by the card holder 48. This power shaft 8 is threaded for a portion of its length so as to form a worm gear adapted to mesh with a tooth carried by a carriage finger 11. This worm gear terminates at one extremity in a smooth cam 10. The worm is of such length and pitch that it will drive the mechanism which it engages throughout its length in one working period.

Figure 6:
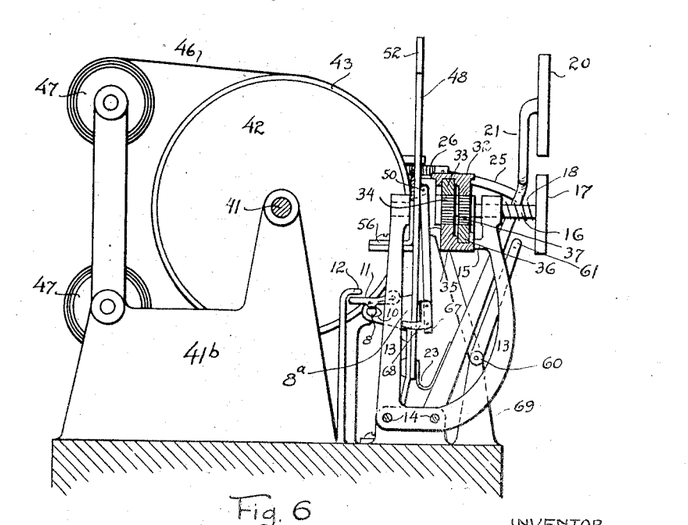
Fig. 6 is an end elevation taken on the line B—B of Fig. 1.
Figure 7:
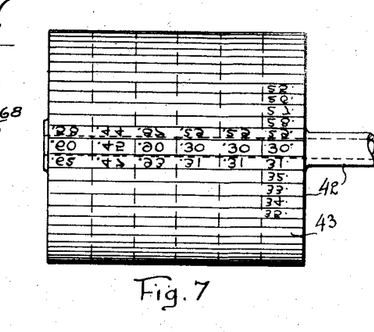
Fig. 7 is a front elevation of the printing wheel.

A carriage 13 is mounted for movement parallel to said shaft 8, upon guide rods 14 (shown in elevation in Fig. 6) and is provided with a pivotally mounted toothed finger which overhangs the threaded portion of said power shaft, and the tooth of which is adapted to enmesh with the worm gear of the shaft so that the carriage will be pulled along sidewise on its stationary guide rods 14, during the time that shaft 8 is being rotated by the movement of the clock. Finger 11, during the forward movement of the carriage, rides underneath stationary guide rod 12, until arriving at the end of the worm gear where it runs out of mesh therewith and rides upwardly upon the smooth cam 10 which lifts the end of the finger 11 up above the guide rod 12 and the action of the spring 19 returns the carriage to its starting position. During the return of the carriage the finger is supported out of mesh with the worm gear by guide rod 12, which is a stationary guide rod extending parallel the shaft.

The carriage is adapted to receive and carry a punch 16, known as the "in" punch, which is permitted longitudinal movement within the carriage mounting, so as to permit it to be forced inwardly to perforate a record card. Spring 18 holds the punch in its outward position away from the card. From the above it will be seen that the punch 16 carried by the carriage, in addition to being used to indicate on the card by perforating the same, the point of commencement of a working period, will also stand ready to perforate the card at any given moment and that similarly a stop 15 carried on the carriage stands ready to arrest the movement of rack 35, in manner hereinafter described, at any moment during a working period.

Figure 3:
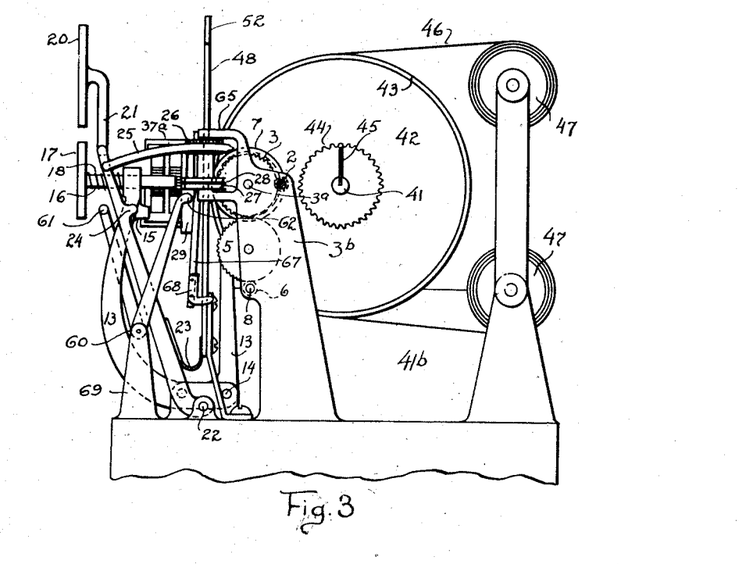
Fig. 3 is an elevation from the clock end.
Figure 4:
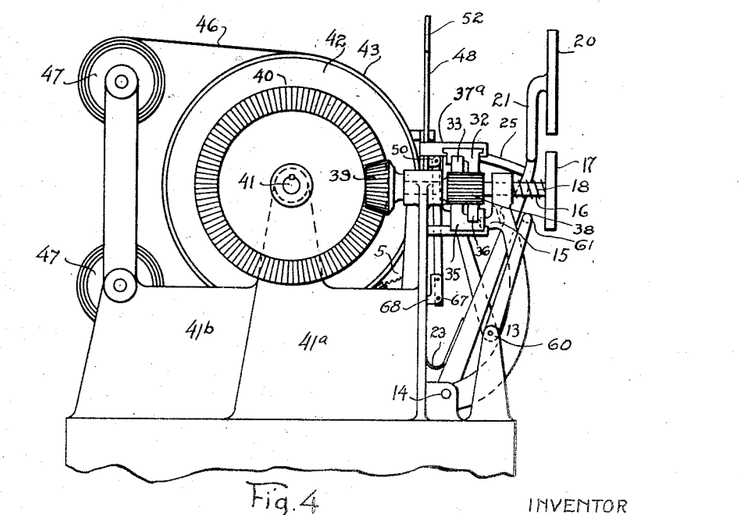
Fig. 4 is an elevation from the opposite end.
Figure 5:
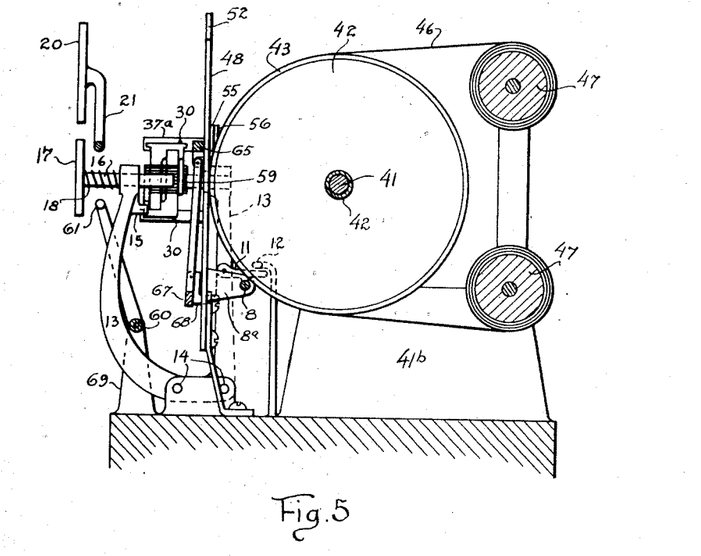
Fig. 5 is an end elevation taken on the line A—A of Fig. 1.

A punching "out" handle 21, known as the "out" handle, pivoted at 22 to the base, and provided with a hand grip 20, is provided, and held in the position shown in Fig. 3, by means of a leaf spring 23. This handle is provided with a spur 24 and an angle arm 25, the inner edge of which arm is adapted to engage a pinion 26 which is mounted for rotation on shaft 26ª, together with a drum 27 about which drum is wound a cable 28. At the other end of cable 28 is fastened a cross arm 29 from each end of which extends rearwardly a flexible cable 30. Upper and lower flexible cables 30 are attached at their ends opposite the cross arm to female members 32 and 35 respectively, of movable rack mechanism. These racks are adapted for longitudinal movement and are held in position by means of a guide plate 37ª.

Figures 15, 16, 17, 18, 19, 20, 21, 23:
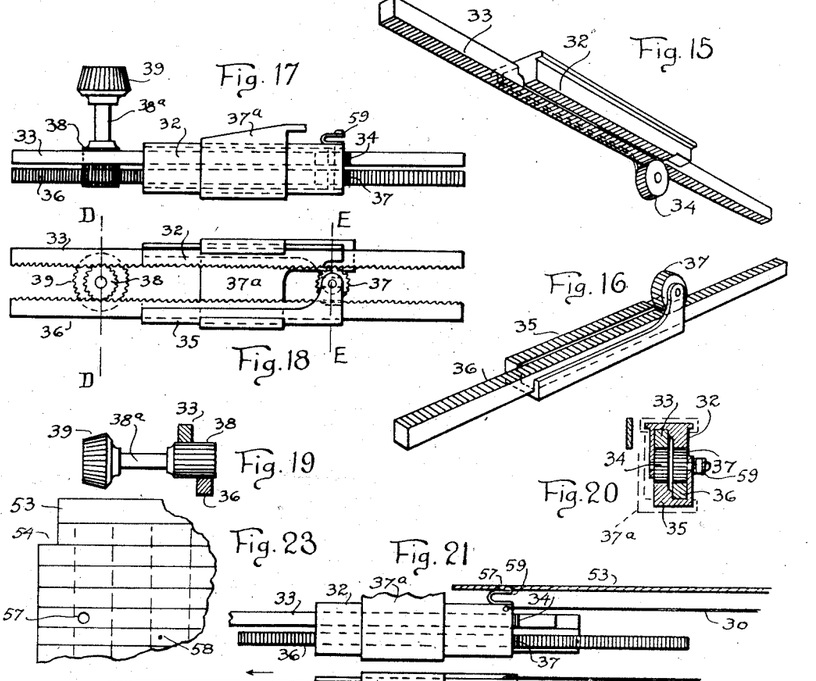
Fig. 15 is a perspective of the upper pair of movable racks.
Fig. 16 is a perspective of the lower pair of movable racks.
Fig. 17 is a plan view of the rack mechanism in engagement with the bevel gear pinion.
Fig. 18 is a side elevation of the mechanism shown in Fig. 17.
Fig. 19 is an elevation of the bevel gear and pinion and the engaging racks shown in mesh therewith as sectioned on line D—D of Fig. 18.
Fig. 20 is a sectional view taken on line E—E of Fig. 18.
Fig. 21 is a fragmentary plan view of the movable racks and card.
Fig. 23 is a fragmentary elevation of the card as shown in Fig. 21.

The rack mechanism comprises upper and lower pairs of racks. The female or sleeved members of each pair to which the cables 30 are attached are longitudinally grooved to receive the freely moving male members of the pair and each female member is provided with an overhanging pinion adapted to mesh with its coöperating male member moving in the groove below. Therefore rack member 32 of the upper pair is sleeved to receive rack member 33 which is engaged by pinion 34 carried by such female member of the pair. The rack member 35 of the lower pair is sleeved to receive rack member 36 which is in turn engaged by pinion 37 carried by such female member of the pair. Pinions 34 and 37, carried by upper and lower female members 32 and 35, respectively are adapted upon occasion to engage the rack edge of opposite female members, but are normally out of engagement therewith.

Carried by a suitably supported standard is a gear shaft 38ª. On one end of this shaft is fixed pinion 38 which is in constant engagement with floating racks 33 and 36 respectively. Upon the other end of this shaft is fixed a bevel gear 39 which engages the main shaft pinion 40. This main shaft pinion 40 fixedly mounted on main shaft 41 rotates said main shaft in suitable bearings provided therefor in standards 41ª and 41ᵇ at each end of the base. Mounted on this main shaft for rotation therewith, but permitted a certain flexibility thereon, is a detachable printing wheel 42 which bears about its entire periphery equally spaced, successive, horizontal lines of interchangeable type, each line consisting of such characters as indicate the values assignable to its position on the wheel as determined by the measurement of the rotation of said wheel. This wheel is designed to make one complete revolution when recording an operation which has occupied one whole working period, which is the time taken for the carriage finger to travel from one end of the worm gear to the other when enmeshed therewith and to ride through a proportionate arc in recording an operation which has occupied a part of such period, in order that the printing type representing computed values assigned to such period or any fraction thereof may be brought into position for recording on a record card.

This printing wheel 42 is not fixed directly to the main shaft 41 but is mounted upon a sleeve which floats on said main shaft. This sleeve is provided at its outer extremity with a toothed wheel 44, the teeth of which correspond in number and position to the horizontal lines of type on the printing wheel. Toothed wheel 44 is so disposed that the teeth thereof will be engaged by the narrowed pointed end of lever 25 carried by the "out" handle which narrowed end acts as a centering lug and positions wheel 44 to coördinate with the horizontal line spaces on the record card. The printing wheel 42 is disposed so as to rotate with the rotation of the shaft 41 by means of a radial spring member 45, which is carried by the main shaft and extends upwardly therefrom, the outer end of which is attached to the gear wheel 44. This method of fastening the printing wheel to the main shaft for rotation therewith, permits of a limited positioning of the wheel about said shaft, yet compels the wheel to rotate with the rotation of the shaft.

Suitably supported in the rear of the printing wheel are ribbon spools 47 about which is wound an inked ribbon 46. This ribbon is not shown as being adapted for automatic movement and may be manually operated to provide fresh inked surface for the type to bear against.

Figures 10, 11, 12, 13:
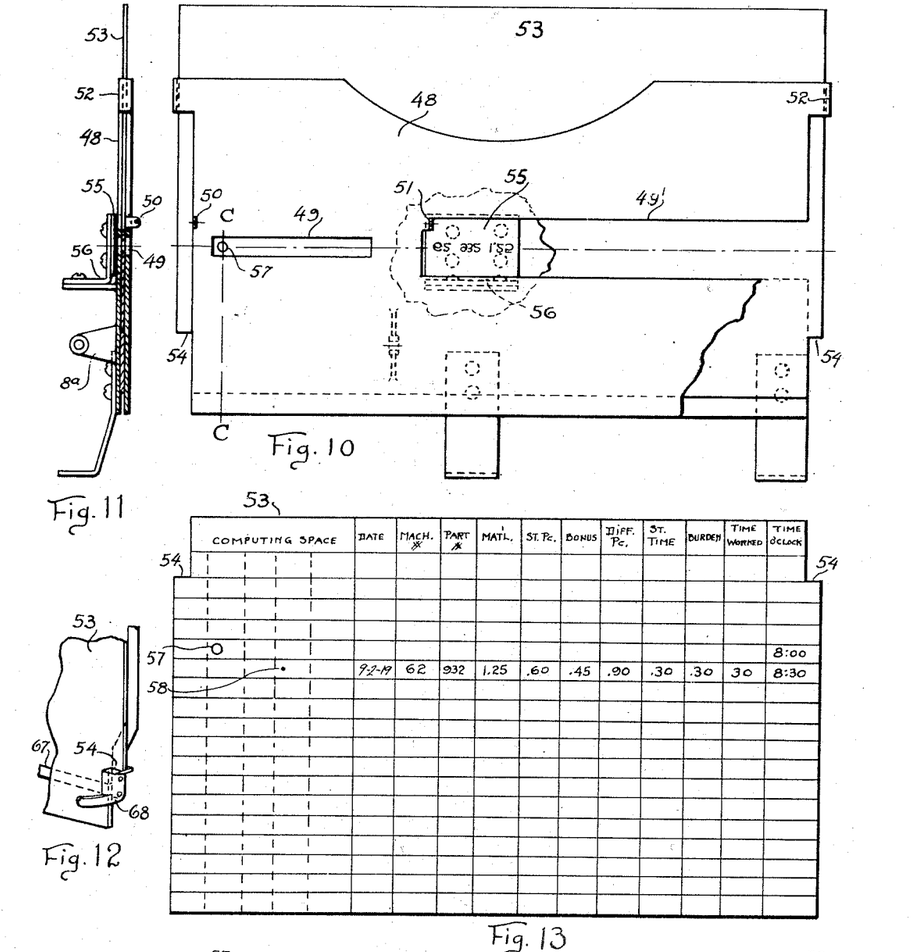
Fig. 10 is a front elevation of the card holder.
Fig. 11 is an end view of the card and holder, taken partly in section on line C—C of Fig. 10.
Fig. 12 is a fragmentary view of the card, and also shows the action of the supporting finger and card clipping knife carried by the cutting bar.
Fig. 13 is an elevation of the card.
Figure 14:
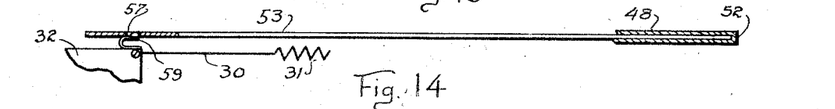
Fig. 14 is a longitudinal section showing the coöperation of the spring button with the perforation in the card.

A card holder 48 suitably supported by brackets from the base is provided and adapted to receive a record card 53. This card holder is shown with an inturned flanged edge 52 to retain the record card in position in such a manner that the face thereof may be presented to the surface of the printing wheel. The card holder is longitudinally slotted as at 49 to provide a passageway for punch 16 of the "in" handle at any position of such handle. It is further longitudinally slotted on a line therewith at 49' to provide a gateway within which are pivotally mounted printing boards 63 and 66.

Printing board 63 is pivoted at 51 to the card holder and at the other end to a fork of arm 65, which arm is integral with end standard 3ᵇ. Such printing board is adapted to be pushed inwardly by spur 24 carried by the "out" handle 21, and is provided with an ear 64 which overlaps, so as to pick up, printing board 66, in order that printing board 66 may be carried inwardly equally with the movement of the board 63.

Printing board 66 is pivoted as shown to downwardly projecting forks of arm 65. Board 66 is adapted to strike the card against the periphery of a time-o-clock printing device when either handle is operated, and by being fixed to a cutting mechanism, hereinafter referred to, serves to also operate said cutting mechanism.

Board 63 is adapted to strike the record card against the periphery of the printing wheel when the "out" handle is operated and the spur strikes the board. This board is not operated by action of the "in" handle.

Figures 8, 9:
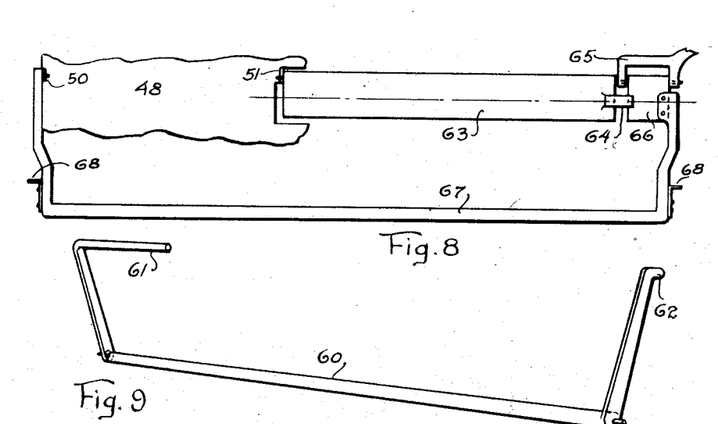
Fig. 8 is an elevation of the cutting bar, also showing the pivoted printing boards and the card holder in fragmentary section.
Fig. 9 is a perspective of the irregularly shaped swing bar 60.

It will be observed that one end of cutting bar 67 is carried by printing board 66, the other end of the bar being pivoted at 50 to an ear on the card holder 48, so that when the printing board 66 is swung inwardly the cutting bar is likewise moved in the same direction. This cutting bar is provided with an inwardly projecting arcuate finger 68 at each end thereof which fingers are adapted to support the card in the card holder and which are further provided with integral angular cutting knives to clip out a section of the corner of the card 53 as at 54, such chopped out portion being such as to allow the card to drop down a distance equal to one horizontal line on the card. This action is more clearly shown in Fig. 12 and will take place when either handle is operated.

The manner in which printing board 66 is operated to permit the above, when the "out" handle is shoved inwardly, has been explained, but board 66 is likewise actuated when the "in" handle is operated, by the action of an irregularly shaped swing bar 60, shown in Fig. 9, which is pivoted to standards 69 of the base, and provided with upwardly projecting arms. One of these arms carries a spur 62 which when the bar is swung inwardly, as it is struck by the "in" handle, in turn strikes the printing board 66 forcing it in the same direction and operating the cutting knives and also striking the record card against the periphery of the time-o-clock printing wheels. The other arm indicated at 61, is disposed to be struck by the inward motion of the "in" handle so that the swing bar may be operated.

Figure 1:
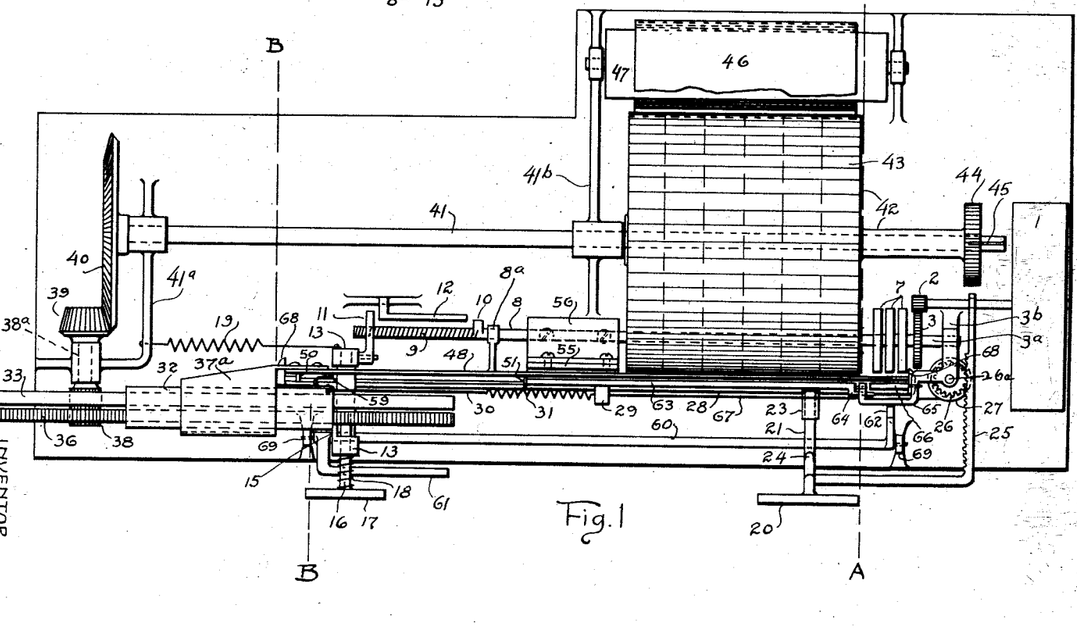
Figure 1 is a plan view of my device.
Figure 2:
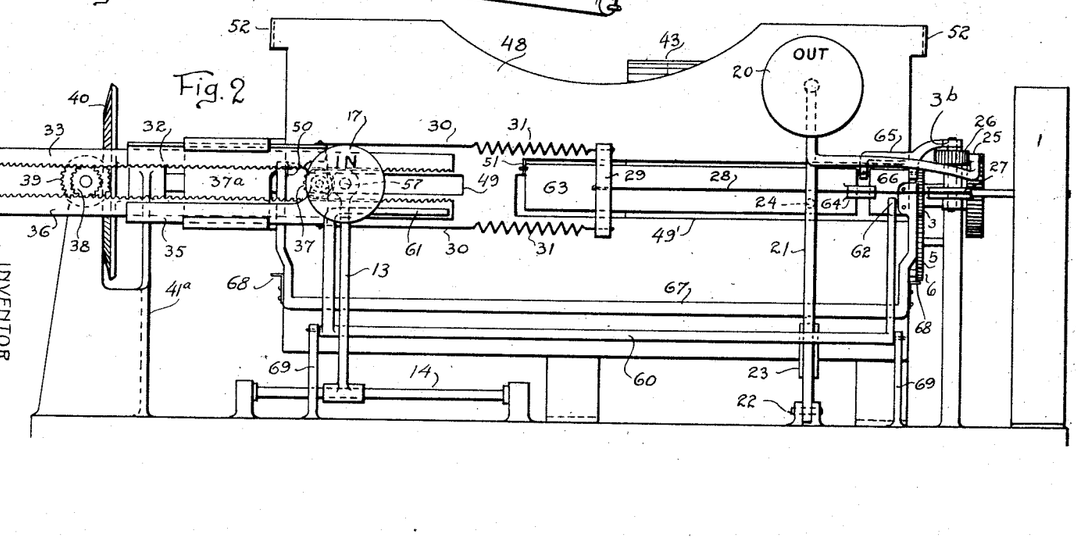
Fig. 2 is a front elevation thereof.

A stationary type stand 55 carried by a suitable standard 56, is shown in Fig. 1, and is provided with interchangeable types on the same line of writing as those on the printing wheel 42. These types are for recording items which do not vary with the time elapsed, such as those shown at the left of the card, under the headings "Date," "Mach.," "Part" and "Mat'l". These headings may of course be changed and the designations referring thereto which are carried on the stand are changeable. Board 63 which strikes the record card against the periphery of the printing wheel also strikes the card against the types carried by this stationary stand.

Means are provided for arresting individually the movement of the female rack members. The stop 15, carried by the movable carriage 13, is disposed in the path of the lower of these female rack members so that the forward movement of such rack will be arrested when it comes in contact with said stop. To arrest the movement of the upper rack member a spring button 59 is provided outwardly from the inner edge of said rack so as to impinge the outer surface of the record card. This button is in alinement with the punch 16, so that when the upper rack arrives at the perforation in the card made by such punch, the button will fall therein and the forward movement of such rack member will be arrested. The button is rearwardly beveled so it may travel back over the perforation without arresting the movement of the rack.

It is apparent that the card may be sectioned and ruled as desired. The horizontal line spaces however would be such as to present a clear horizontal space to the types after each chopping out operation and the consequent drop of the card. The headings would be arranged so as to provide spaces for the information which might be desired depending on the particular shop practice. Provision might be made so as to enter information merely as to straight time, overtime, or bonus, or any other set of values determinable upon a basis of time elapsed.

Indicated at 7 is a time-o-clock printing apparatus. These devices are of known design and no claim is made thereto. It is provided in form to indicate minutes and hours and operated by the clock mechanism that operates the machine. This device is of course, alined with the rows of type on the printing wheel.

The operation of the device is as follows:
A record card is inserted in the card holder by the workman, face toward the printing wheel, card upside down. The chopped out end ledges of the card rest upon the inwardly projecting fingers 68 of the cutting bar 67. Power shaft 8 is being rotated by means of mechanism heretofore described from the clock 1. At the commencement of an operation the "in" handle 17 is operated. This inward action of the handle 17 perforates the card at 57 by means of punch 16, and at the same time, arm 61 of the swing bar 60 is carried inwardly, and the spur 62 carried on the opposite arm of said swing bar is forced against the board 66, causing the board to strike the card against the periphery of the time-o-clock printing mechanism so as to record the time of commencement of an operation. As board 66 is swung inwardly, it carries along therewith cutting bar 67 so that the corners of the card are chopped out the depth of one line and the card drops down to be in readiness to receive on a clear line the next impressions to be recorded thereon. These choppers are angular knives integral with the supporting fingers 68.

As time elapses the rotation of the power shaft draws the carriage sidewise along upon its guide rods by virtue of the pivotally mounted finger 11 being engaged with the worm gear of the shaft.

When a workman has completed a task, the card is placed in the card holder as before, it now falls to a clear line because of the chopping out performed at the completion of inward motion of the "in" handle. The "out" handle is now operated, of which rack arm 25 forms an integral part, the inner rack edge of which is enmeshed with gear 26 rotatably mounted with the drum 27, and the cable attached to the drum is wound therearound. This cable 28, draws forwardly, by means of cross arm and flexible extensions 30, the sleeved rack members 32 and 35. As these sleeved rack members travel forward, their overhanging pinions 34 and 37, idle over the floating-racks 33 and 36 respectively. These sleeved racks will continue to move forwardly, their pinions idling over the male rack members until the movement of one of the female rack members is arrested. Then when the rack edge of a female member starts to pass the pinion carried by the opposite female member it enmeshes therewith, rotating the same in a reverse direction, forcing its coöperating male member to the rear.

If the task is completed during the same working period, in which it was begun, (see Figs. 13, 21 and 23), then the upper sleeve member will be arrested by the spring button carried thereby engaging in the perforation 57 of the card. Because of the flexible cable connection, the other female member will continue to travel forwardly until its movement is arrested by stop 15 carried by the traveling carriage, the position of which stop will indicate the point to which the carriage has been moved after the commencement of a task, and consequently will be the measure of the rotation of the power shaft, or a time measure. Therefore, the distance that the lower sleeved rack member travels after the movement of the upper rack member has been arrested will measure the time elapsed from the commencement of the period and this will be recorded on the card by the measured rotation of the printing wheel.

The printing wheel will be rotated a measured distance because of the reverse motion imparted to the male member 33, which meshing with pinion 38 rotates through bevel gear 39 the main shaft 41 and the printing wheel mounted thereon. This rotary movement of the printing wheel will consequently measure the time elapsed as it represents the travel by one rack member after the other rack member has been halted.

Figures 22, 24, 25, 26:
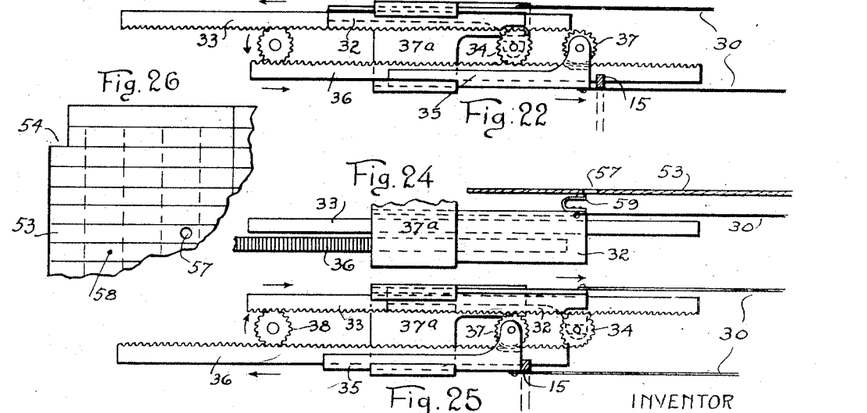
Fig. 22 is an elevation of the movable racks and operating cables.
Fig. 24 is another fragmentary plan view of the movable racks and card.
Fig. 25 is another elevation of the movable racks and operating cables.
Fig. 26 is a fragmentary elevation of the card, as shown in Fig. 24.
Figure 27:
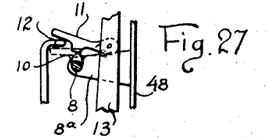
Fig. 27 is a fragmentary sectional elevation showing the carriage finger being engaged with the worm gear and as it is being lifted by the cam to guide return rod 12.

Assuming that a job is commenced in the middle of a time period, the "in" handle perforates the card at, say, 57, Fig. 26. In that case the lapsation of time before the job is completed and the "out" handle is operated, may carry the moving finger 11 to the end of the threaded section of the power shaft, completing one period, and finger 11 will ride upon the cam 10 to the guide rod 12, and the carriage will be returned to the point of commencement by the action of spring 19. A new period will then be instituted. To measure the time, punching out will have to occur before a period has been exceeded in time, and supposing that the "out" handle is operated before the carriage has traveled forward to the point of commencement of the period, as is indicated at 57 in Fig. 26, in this instance, before the rack carrying the spring button has arrived at the perforation in the card indicating the point of commencement of a work period, the lower female rack member is arrested by the stop on the carriage as indicated at point 58 on the card. The male rack member travels backward as the opposite female rack member continues forward until it is arrested by the perforation in the card engaging its spring contact. The printing wheel will be operated in the reverse direction. The values of elapsed time would in this instance have to be arrived at by computation, subtracting the recorded amounts from the total amounts for a complete time period, as the recorded amounts would be the amounts represented by the values based on the time which would have been required to complete a time period to point of beginning, rather than the elapsed time. The machine therefore is not particularly adapted for this method of computation. The "out" handle should be actuated, recording the values representing elapsed time, before the natural time period of the machine has been exhausted.

It will be observed that definite time, periods are provided for during which the printing wheel is adapted to make one complete revolution, but that these time periods may be of such length as it is desired. Punching out will have to occur however, before a time period is over-run, or it will measure only the amount in excess of a full period.

The type plates carried on the periphery of the printing wheel would be interchangeable and such information could be collected as is desired to be recorded. In the printing wheel shown, certain columns have been made constantly equally variable and others variable at different ratios. For example one column might be a series of numbers vertically arranged representing computations of straight time wage varying directly as the time elapsed. Another vertical column might represent bonus computations, which would be a varying ratio; another might represent a piece price differential rate, a varying ratio but of a different character, but all these values would bear some relation to time elapsed and could be computed on that basis and consequently placed on the periphery of the printing wheel, so as to be brought into position for recordation purposes by the rotation of said wheel a distance representing lapsed time.

It will be further observed that though the printing of the time-o-clock occurs with the operation of either handle, as well as the chopping out of the corners of the record card, the printing of the characters relating to time values occurs only with the operation of the "out" handle.

Having thus described my invention, what I claim is:

1. In a device of the class described, a clock mechanism, a card holder adapted to receive a record card, a punch adapted to perforate said card, said punch mounted so as to be moved parallel to the face of the card by the movement of the clock at a measured rate, a stop carried by said punch, upper and lower pairs of racks mounted for actuation parallel to said card, means for actuating the same, means provided to arrest the movement of one of said racks when it arrives opposite the perforation of said card made by the punch, means provided to permit the other of said racks to continue to travel until its movement is arrested by a stop carried by the punch, a printing wheel mounted for rotation, means provided for rotating said printing wheel, said means adapted to operate during the period of time that one rack travels after the travel of the other rack has been halted.

2. In a clock controlled mechanism of the class described, a card holder adapted to receive a card, a punch adapted to perforate said card at the commencement of a period to be measured, said punch mounted for movement parallel said card, and provided with means for being actuated at a given rate of travel by the movement of said clock, upper and lower pairs of racks comprising male and female members mounted for actuation parallel to said card, means for actuating both of said female members until one of the same arrives opposite the punch mark on the card, means for halting one of said racks at said point, means for allowing the other female member to continue forward until it arrives at the point to which the punch has been moved by the actuation of the clock mechanism, means for rotating a printing wheel a distance proportioned to the distance traveled by one of said rack members after the other rack member has halted.

3. In a clock mechanism of the class described, a card holder adapted to receive a record card, a traveling carriage adapted to be moved parallel to the face of said card at a measured rate by the movement of said clock mechanism, a printing wheel mounted for rotation, a punch adapted to perforate said card at any position of the carriage to indicate commencement of a period to be measured, means for measuring the distance traveled by said carriage after the card has been perforated and for rotating said printing wheel through an arc proportioned thereto.

4. In a clock controlled mechanism of the class described, a power shaft mounted for rotation from said clock mechanism at a measured rate, a worm gear on said shaft measuring a time period, a hopper adapted to receive a record card, said card, a carriage adapted to travel parallel to the face of said card at a rate measured by the rotation of said shaft through means carried by said carriage which engage the worm gear of said shaft, means for perforating said card at a point indicatin the commencement point of travel of said carriage, a printing wheel mounted for rotation, upper and lower pairs of racks comprising male and female members adapted for movement parallel the path of travel of said carriage, male members constantly in mesh with means for rotating said printing wheel, said means, female members adapted to idle along said male members until they arrive at the instant position of the carriage or the point of commencement of travel of said carriage as indicated on the card, means for arresting one of said female members at each of said points, means actuating said male members a distance proportioned to the direct distance between said points.

5. In a clock controlled mechanism of the class described, a power shaft mounted for rotation, a measured worm gear on said shaft, means for rotating said shaft from said clock mechanism, a card holder adapted to receive a record card, said card, a carriage adapted to be moved parallel the face of said card at a measured rate through means meshing with said worm gear, means for indicating on said card the point of commencement of travel of said carriage, a printing wheel mounted for rotation, upper and lower pairs of racks comprising male and female members, the male members thereof being constantly in mesh with a pinion adapted to rotate said printing wheel, said pinion, means for idling said female members along said male members during the time both of said female members are in motion, means for arresting the motion of one of said female members at the commencement point indicated on the card, means for arresting the motion of the other of said female members at the instant position of the carriage, means for actuating said male members as the movement of one of the female members is arrested and until the movement of the other female member is arrested.

6. In a clock controlled mechanism of the class described, a power shaft mounted for rotation from said clock mechanism, a worm gear on said shaft measuring a time period, a card holder adapted to receive a record card, said card, means for perforating said card at the commencement of a period to be recorded, a carriage adapted to be moved parallel the face of said card at a measured rate by the rotation of said worm gear, a printing wheel mounted for rotation, upper and lower pairs of racks, one rack of each pair constantly in mesh with means for rotating said printing wheel, the other rack of each pair adapted to idle longitudinally along its coöperating rack in pair, the movement of the idling rack of one pair adapted to be arrested when it arrives at the perforation in said card, the movement of the idling rack of the other pair adapted to be arrested when it arrives at the instant position of the carriage, means provided for setting in motion the printing wheel actuating racks as soon as the movement of one of said idling racks is arrested and until the movement of the other of said idling racks is arrested.

7. In a clock controlled mechanism of the class described, a power shaft mounted for rotation from said clock mechanism, a worm gear on said shaft measuring a time period, a card holder adapted to receive a record card, said card, means for perforating said card at the commencement of a period to be recorded, a carriage adapted to be moved parallel the face of said card at a measured rate by the rotation of said worm gear, through means enmeshed with said gear, a stop carried by said carriage, a printing wheel mounted for rotation, upper and lower pairs of racks mounted for movement parallel said card, said pairs comprising male and female members, the male members thereof being constantly in mesh with a pinion, means provided so that the rotation of said pinion will rotate said printing wheel, said female members adapted to idle longitudinally along said male members during the time both said female members are idling, the movement of the idling rack of one pair adapted to be arrested when it arrives at the perforation in said card, the movement of the idling rack of the other pair adapted to be arrested by the carriage stop, means provided so that upon the halting of either idling rack the other will continue to travel forward until its movement is arrested, means provided so that either idling rack during the time that it alone is traveling will actuate a male member so that the pinion which actuates the printing wheel will be rotated.

8. In a clock controlled mechanism of the class described, a power shaft mounted for rotation from said clock mechanism, a worm gear on said shaft measuring a time period, a card holder adapted to receive a record card, said card, a carriage adapted for movement parallel the face of said card at a measured rate by the rotation of said worm gear through means enmeshed therewith, a punch for perforating said card carried by said carriage, a stop carried by said carriage, a printing wheel mounted for rotation, means for rotating the same from a pinion, said pinion, upper and lower pairs of racks comprising male and female members, the male members thereof constantly in mesh with said above pinion, said racks adapted for movement parallel the path of travel of said carriage, the female members of each pair adapted to idle along said male members, means for arresting the movement of one of said female members when it arrives at the perforation made in the card by the punch carried by the carriage, means for arresting the movement of the other female member by the stop carried by the carriage when it arrives at the instant position thereof, means for picking up one of said male members and actuating the same so as to actuate the printing wheel pinion, in turn rotating the printing wheel, as soon as the movement of one of said female members has been arrested and actuating said male member until the movement of the other of said female members has been arrested.

9. In a clock controlled mechanism of the class described, a power shaft mounted for rotation from said clock, a worm gear on said shaft, a card holder for retaining a record card, said card, a carriage adapted for movement parallel the face of said card by means of an overhanging finger adapted to mesh with the worm gear of said shaft, said finger, means for disengaging said finger from said gear when it arrives at the end of said gear, means for then returning said carriage to its starting position, means for perforating said card, means for chopping out the corners of said card so it will fall a measured distance within said holder, means for operating said chopper coincident with the perforation of said card, a printing wheel mounted on a shaft for rotation therewith but permitted limited flexibility thereon, a pinion provided with means for rotating said printing wheel shaft, upper and lower pairs of racks adapted for movement parallel the power shaft, one rack of each pair constantly in mesh with said printing wheel pinion, the other rack of each pair adapted to idle longitudinally along its coöperating rack in pair, means for arresting the movement of the idling rack of one pair when it arrives at the perforation in said card, means for arresting the movement of the idling rack of the other pair when it arrives at the instant position of the carriage, means for setting in motion the racks constantly in mesh with said printing wheel pinion as soon as the movement of one of the idling racks has been arrested and for continuing the same until the movement of the other idling rack is arrested, a printing board mounted to strike said card against the periphery of the printing wheel, a drum adapted to rotate coincident with the striking of the printing board against the printing wheel, a cable wound around said drum provided with extensions attaching the same to the idling racks so that said racks will be drawn forward when said drum is rotated.

10. In a clock controlled mechanism of the class described, a power shaft mounted for rotation from said clock mechanism, a worm gear on said shaft, a card holder, a record card, a carriage adapted for movement parallel the face of said card as it stands in the card holder, a pivoted finger on said carriage overhanging said worm gear and enmeshed therewith, a punch carried by the carriage for perforating said card, a stop on said carriage, a printing wheel mounted for rotation, means for rotating the same from a pinion, said pinion, upper and lower pairs of racks comprising male and female members, said racks adapted for movement parallel the face of said card, one rack of each pair being constantly in mesh with the pinion adapted to rotate the printing wheel, the other rack of each pair provided with means for actuating the same, female rack members adapted to idle along coöperating male members but provided with an overhanging pinion enmeshed therewith, means for arresting the movement of the idling rack of one pair when it arrives at the perforation in the card, the idling rack of the other pair adapted to be arrested by the stop on the carriage when it arrives thereat, means for striking the card against the periphery of the printing wheel, means for setting in motion the female rack members coincident therewith, means for printing the time-o-clock on the card, means for striking the card against such time-o-clock printing mechanism at the commencement and finish of an operation coincident with chopping out the corners of the card, means for chopping out the corners of the card to permit the card to drop downward in the card holder a determined distance when the card is perforated and when the card is struck against the periphery of the printing wheel.

11. In a clock controlled mechanism of the class described, a card holder, a record card adapted to be received therein, means for printing the time-o-clock on said card, means for chopping out the corners of said card when the time-o-clock is printed thereon so the card will fall a determined distance in said holder, means for striking said card against said time-o-clock printing mechanism, a rotatably mounted printing wheel adapted to bear on its face a series of interchangeable types, said series representing a table of values which bear a measured relation to time elapsed and arranged in successive horizontal lines on said printing wheel, means for striking said card against the periphery of said wheel coincident with the printing of the time-o-clock at the conclusion of a period or fraction thereof, means for rotating said printing wheel so as to bring the value representing any lapsed period of time into position to be printed on the card at the expiration of said lapsed period.

12. In a clock controlled mechanism of the class described, a rack for holding a record card, means for perforating said card at the commencement of a time period, a worm gear driven by said clock, means meshing with said gear adapted to be moved along the face of said card, elapsed time value recording mechanism adapted to be actuated to record values of elapsed time as measured by the distance traveled by said worm gear driven means along the face of said card.

13. In a clock actuated time value recorder, a clock, means for indicating on a record card the beginning of a time period, a line shaft rotated by said clock, said shaft provided with a worm gear, means adapted for movement parallel to said shaft by the rotation thereof, elapsed time value recording mechanism adapted to be actuated to record values of elapsed time as measured by the distance traveled by said shaft actuated means after the indication of commencement of a time period on the card.

14. In a clock controlled mechanism of the class described, a clock, a card holding rack, a punch for perforating a card held in said rack to indicate commencement of a time period, a shaft adapted to be rotated by said clock mechanism, said shaft provided with a worm gear, said punch mounted for movement parallel the face of the card in the rack by means meshing with the worm gear of the shaft, elapsed time value recording mechanism adapted to be actuated to record values of elapsed time as measured by the distance traveled by said punch after perforating said card.

15. In a time value recorder, a rack adapted to receive a record card, a clock driven carriage adapted to move across the face of such card, a printing wheel bearing on its periphery, in successive lines of type, values computed on the basis of lapsed time as measured by their position on the wheel, means for rotating such printing wheel a distance proportioned to the travel of the carriage.

16. In a time value recorder, a card holding rack, a clock, a carriage driven by said clock adapted to move across the face of a card when carried in such rack, a printing wheel mounted for rotation bearing on its periphery successively arranged lines of type representing values computed on the basis of time elapsed, means for indicating on such card the position of the carriage at the commencement of a time period, means for measuring subsequent travel of such carriage and for rotating the printing wheel a distance proportioned thereto.

17. In a time value recording mechanism, a printing wheel mounted for rotation, a card holder adapted to receive a record card, a traveling carriage adapted to be moved across the face of such record card at a measured rate by a clock driving mechanism, means for indicating on such card the point of commencement of travel of such carriage, means for rotating the printing wheel a distance proportioned to the distance traveled by such carriage at any point in its travel across the face of the card within a travel period.

18. In a time value recording mechanism, a printing wheel mounted for rotation, a card holder adapted to receive a record card, a carriage adapted to be moved parallel the face of such card by clock mechanism, at a measured rate, means for indicating on such card the position of such carriage at any point in its path of travel, means for rotating the printing wheel a distance proportioned to the subsequent travel of such carriage.

19. In a time value recording mechanism, a carriage adapted to be moved transversely across the face of a record card a measured distance in a given time period by means of a clock drive, a printing wheel bearing on its periphery in successive lines of type a series of values computed on the basis of time elapsed as measured by their position on the wheel one complete revolution of the wheel corresponding to the given time period of travel of such carriage, a card holder for receiving a record card, means for indicating on such record card the position of the carriage at the commencement of a period of time to be measured, means for rotating such printing wheel through an arc proportioned to the distance traveled by such carriage to any point in its time period.

20. In a time value recording mechanism, a card holder, a clock, a clock driven traveling carriage adapted to move across the face of a card when carried in the card holder, means for indicating on such card the point of commencement of travel of such carriage, a printing wheel bearing on its periphery in successive lines series of values computed on the basis of time elapsed, a pair of traveling racks adapted to be actuated when elapsed time values are registered on the card, said racks adapted to move across the face of the card, the movement of one of said racks adapted to be arrested when the rack arrives at the point of commencement of travel of the carriage, the movement of the other of said racks adapted to be arrested when the rack arrives at the instant position of the carriage, means for rotating said printing wheel a distance proportioned to the distance traveled by the one of said racks after the motion of the other of said racks has been thus arrested.

21. In a time value recording mechanism, a clock, a card holder, a clock controlled carriage adapted to be moved across the face of a card carried in the card holder, means for perforating the card at any point in the period of travel of said carriage, a printing wheel bearing on its periphery series of values computed and arranged thereon on the basis of time elapsed, a pair of traveling rack members adapted to be drawn across the face of said card, means for arresting the travel of one of said rack members when it arrives opposite the perforation in the card indicating the point of commencement of travel of said carriage, means meshing with said rack members adapted to drive said printing wheel during the movement of one of said rack members after the travel of the other of said rack members has been arrested.

In testimony whereof I sign this specification.

PAUL WILSON.